United States Patent [19]
Spearman et al.

[11] Patent Number: 5,916,435
[45] Date of Patent: Jun. 29, 1999

[54] CONICAL CORELESS FILTER ASSEMBLY AND ELEMENT

[75] Inventors: Michael R. Spearman, The Woodlands, Tex.; John J. Brockman, St. Paul, Minn.

[73] Assignee: Porous Media Corporation, St. Paul, Minn.

[21] Appl. No.: 08/788,988

[22] Filed: Jan. 27, 1997

[51] Int. Cl.[6] .......................... B01D 27/06; B01D 35/14
[52] U.S. Cl. ................ 210/132; 210/493.3; 210/497.3; 55/521
[58] Field of Search .......................... 210/493.3, 497.3, 210/497.01, 130, 132; 55/521

[56] References Cited

U.S. PATENT DOCUMENTS

| | | |
|---|---|---|
| 1,855,904 | 4/1932 | Brown et al. . |
| 2,823,760 | 2/1958 | Andersen . |
| 4,038,194 | 7/1977 | Luceyk et al. . |
| 4,243,397 | 1/1981 | Tokar et al. . |
| 4,498,915 | 2/1985 | Witchell . |
| 4,844,795 | 7/1989 | Halwani . |
| 4,882,055 | 11/1989 | Stamstad . |
| 5,250,179 | 10/1993 | Spearman . |
| 5,618,425 | 4/1997 | Mitamura et al. . |
| 5,632,793 | 5/1997 | Haggard . |
| 5,685,887 | 11/1997 | Mochida . |
| 5,705,069 | 1/1998 | Nagaoka . |

OTHER PUBLICATIONS

TIMIZATION Update; Reducing Filtration Costs and Reducing Filter Element Disposal; 1993 Porous Media Corporation.
MAXUM Coreless Elements; The Unique Combination of Disposability and Performance; 1993 Porous Media Corporation.
The Future of Filtration; 1994 Porous Media Corporation.

*Primary Examiner*—David A. Reifsnyder
*Attorney, Agent, or Firm*—Marshall & Melhorn

[57] ABSTRACT

An improved conical coreless filter element is shown which has an open upper end cap and a lower closed end cap. The conical coreless filter element fits inside a support cage or basket of complimentary conical shape which has a diameter the same size as or slightly larger than the diameter of the conical coreless filter element at any given point. The upper end cap contains sealing means such that it will seal to the filter cage and the filter cage itself has an annular housing adapter or member which seals to a tube sheet or a filter housing. The filter media may be pleated and may be made of a wide variety of materials which may be compactable and/or incinerateable. Likewise the end caps may also be made of a wide verity of materials to provide chemical compatability with the fluids being filtered.

32 Claims, 9 Drawing Sheets

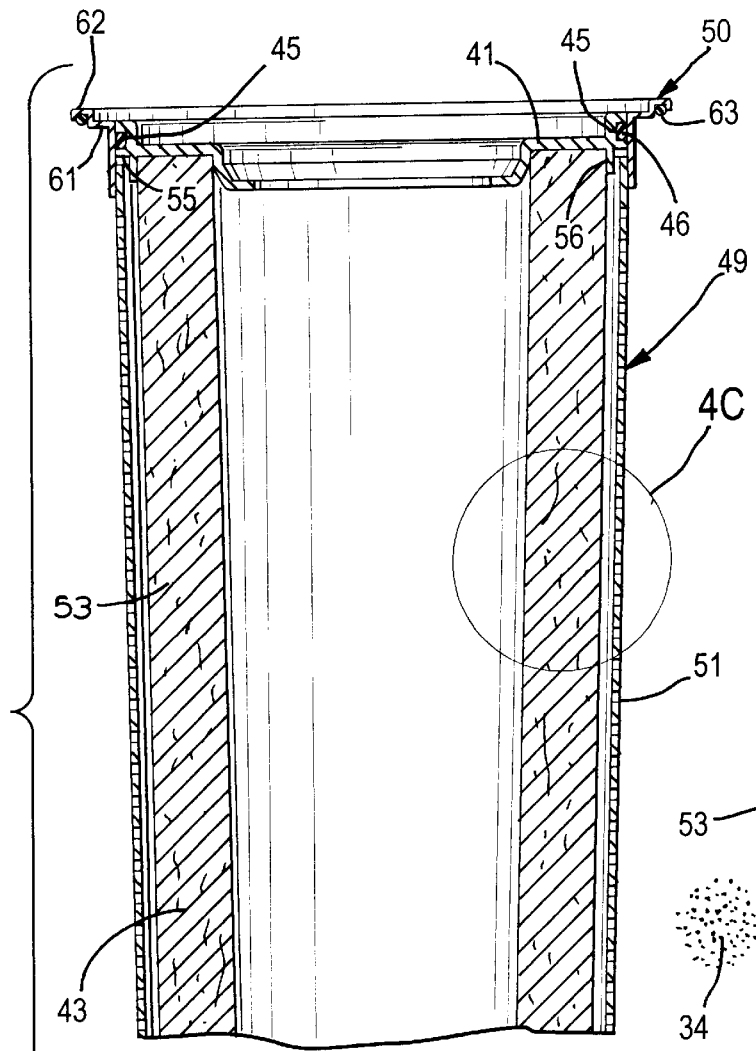
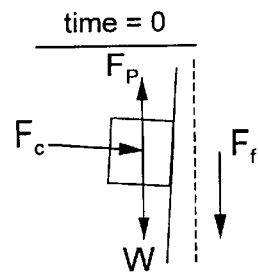
FIG. 4A
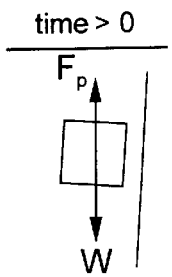
FIG. 4B
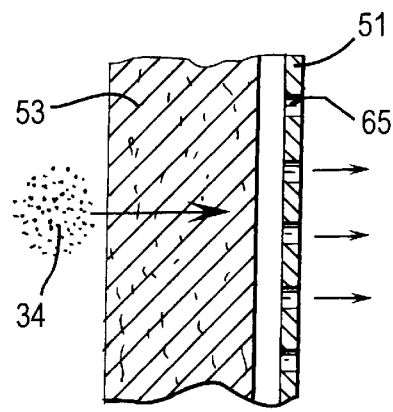
FIG. 4C
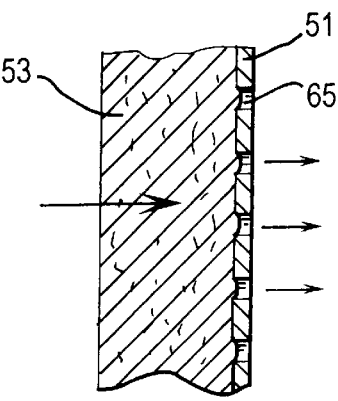
FIG. 4D
FIG. 4

CONICAL CORELESS FILTER ASSEMBLY AND ELEMENT

BACKGROUND OF THE INVENTION

1. Field of the Invention

The present invention relates to filters. More particularly, the present invention relates to filter assemblies for filtering particulates from a fluid. Most particularly, the present invention relates to a conical fluid filter cartridge and a method of sealingly mounting such filter cartridge in a conical filter housing and/or support and/or cage of a diameter the same as, or slightly larger than, the diameter of the conical filter cartridge.

2. Description of the Prior Art

The need to filter a wide variety of fluids to remove solids of almost any size and composition is widely known. A device widely used for filtering, for example, particulates from a liquid, is a single stage filter bag within a perforated basket or core. However, also widely known in the art is the fact that such bag filters have a relatively short life, and have a tendency to unload or blow the contaminant right through the filter basket if the pressure differential gets too high. Also, for their volumetric size, bag filters do not provide much surface area or dirt holding capacity in relation to their diameter. Thus, those skilled in the art sought a solution as to how to provide a more efficient, and less costly, method of removing solids from a wide variety of fluids.

Applicant's assignee, in an attempt to solve the problems with bag filters, developed a pleated coreless, cylindrical filter element. It was found that either one large, or three smaller diameter coreless filters and support cages could be placed in the space formerly occupied by a single bag filter and give a large increase in surface area. However, an unanticipated problem arose. While a bag filter is flexible, a pleated coreless filter is much less flexible. Since the bag filter and the coreless filter both flow inside to outside, as the particles were being removed from the fluid, they would form a filter cake on the inside of the filter media. The filter media was pressed into the retaining cage and its openings, and removing the filter by pulling straight up was difficult. While the bag filter was flexible, and a mere shaking of the filter would cause the cake to fall off the sides of the bag where it could easily be removed from the filter, this did not happen with the cylindrical coreless filters. Not only does the filter media extrude into the perforations of the retaining cage, in some cases the elements fill up completely with solids, forming a solid tube, making removal extremely difficult. This problem was further exacerbated when, under certain change out procedures such as steaming or drying filters prior to change out, the filter cake became almost cement-like, providing even more rigidity to the media. Therefore, there continued to be a search for a solution as to how to provide a greater filtration area than a bag filter, but without the filter element removal problems of the coreless pleated filter.

SUMMARY OF THE INVENTION

In order to solve the problems in the prior art, an improved coreless filter element is provided which has an open upper end cap and a lower closed end cap, and is conical in shape. The conical or frustraconical coreless filter element fits inside a support cage or basket which has an inside diameter the same size as, or slightly larger than, the outside diameter of the coreless filter at any given point. The upper end cap contains sealing means such that it will seal to the filter cage, and the filter cage itself has an annular housing adapter or member which seals to a tube sheet in a filter housing.

In one embodiment of the invention, a conical or frustraconical filter element having a solid lower end cap, and an upper annular end cap, is provided. The upper annular end cap has an outwardly facing peripheral groove with an O-ring for sealing the conical or frustraconical filter element in a conical member.

In another embodiment of the present invention, a conical or frustraconical pleated filter element is provided which has a lower end cap, and a top end cap having a fluid opening and a flat flange. The flat flange seals against an upwardly facing annular sealing groove having an O-ring provided in a conical member.

In yet another embodiment of the invention, a conical or frustraconical pleated filter element is provided having a solid lower end cap and an annular upper end cap having a flat flange. No sealing means are provided on the upper end cap. Instead, an inwardly facing groove with an O-ring is provided on the interior periphery of a conical member to engage a portion of the upper end cap.

In yet another embodiment of the present invention, a conical or frustraconical pleated filter element is provided having a solid lower end cap and an upper annular end cap. The conical or frustraconical pleated filter element is used in combination with a conical member having a diameter the same as, or slightly greater than, the diameter of the conical or frustraconical pleated filter element. The conical or frustraconical member has an upper annular housing adapter which accepts the pleated conical or frustraconical filter element, a perforated conical or frustraconical filter cage of the same diameter or slightly larger than the diameter of the conical or frustraconical pleated element, and a lower end cap.

Therefore, it is an object of the present invention to provide a highly efficient replacement for bag filters, which provides a greater surface filtration area than the bag filters, and which does not have the problems of removal that previous substitutes for bag filters have had.

Further objects and advantages of this invention will be apparent from the following description and appended claims, reference being made to the accompanying drawings forming a part of the specification, where in like reference characters designate corresponding parts in the several views.

BRIEF DESCRIPTION OF THE DRAWINGS

FIG. 4 is a sectional elevational view of the frustraconical pleated element shown in FIG. 3;

FIG. 4A is a force diagram similar in part to FIG. 3A, but showing the forces needed for the removal of the frustraconical filter element of the present invention;

FIG. 4B is a force diagram similar in part to FIG. 4A, but showing the forces needed to continue the removal of the frustraconical filter element at some point after the initial movement of the element, at T=0.5 seconds, for example;

FIG. 4C is a view showing the filter element of FIG. 3 where no filter cake has accumulated, and the differential pressure has not forced the filter media into the filter cage;

FIG. 4D is a view similar in part to FIG. 4C, but showing the filter element at the time near the end of its useful life when the filter media has been forced or extruded into the openings in the filter cage due to the buildup of a substantial filter cake;

It is to be understood that the present invention is not limited in its application to the details of construction and arrangement of parts illustrated in the accompanying drawings, since the invention is capable of other embodiments, and of being practiced or carried out in various ways within the scope of the claims.

Also, it is to be understood that the phraseology and terminology employed herein is for the purpose of description, and not of limitation.

DESCRIPTION OF THE PREFERRED EMBODIMENT

Figure 1:
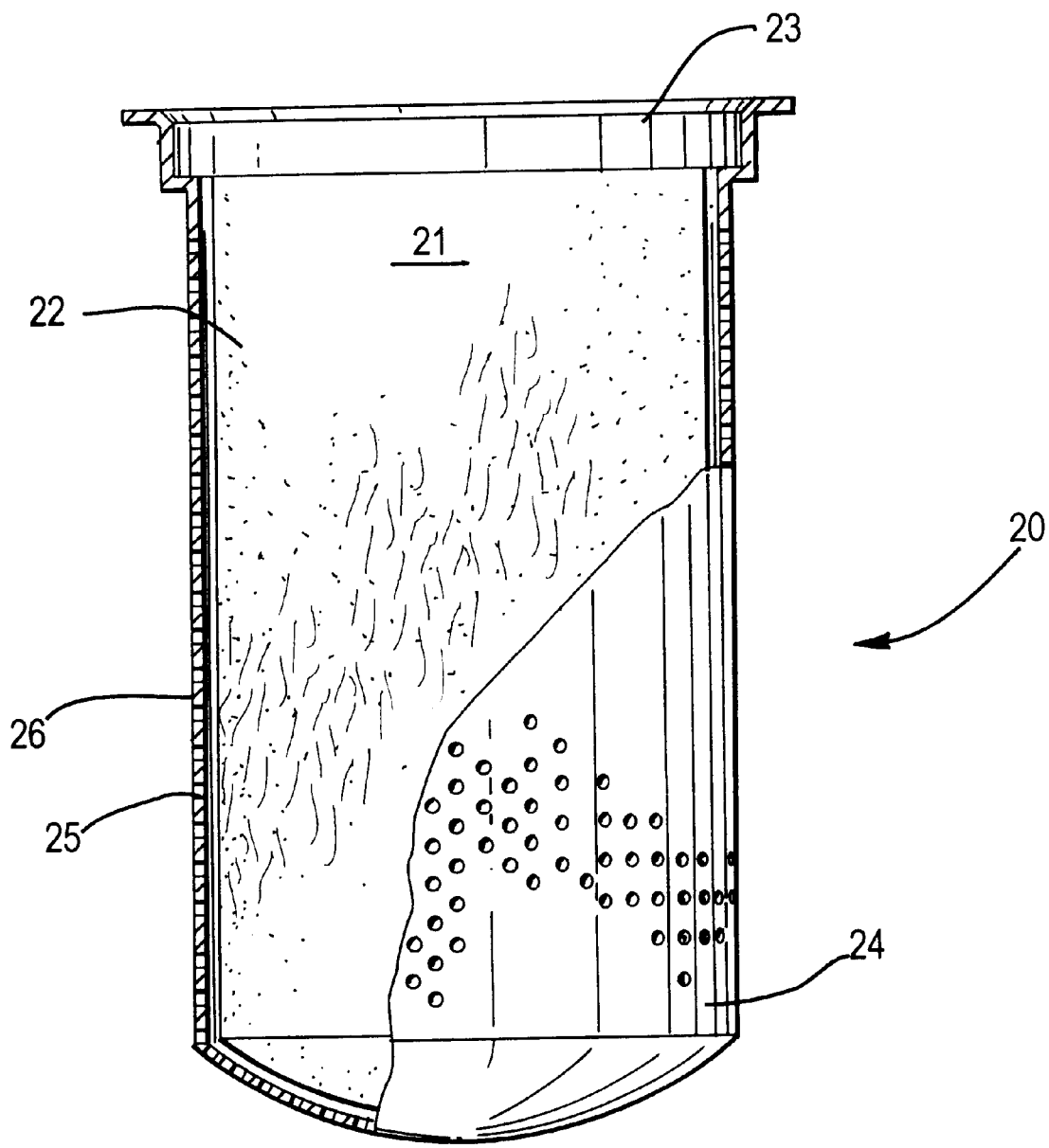
FIG. 1 is an elevational view, partly in section, of a single stage prior art bag filter within a perforated basket or support.

Shown in FIG. 1 is the prior art bag filter assembly, generally designated by the numeral 20, which includes a bag filter 21 having a suitable cloth material 22 mounted to a bag rim 23, which is sealingly held in the filter basket or cage 24. Perforations 25, normally in the order of 9/64 of an inch, are provided in the wall 26 of the filter basket 24.

Although easy to clean and service, the bag filters 21 are known to have a very short life, and have a tendency to unload if the pressure differential gets too high. For this reason, it was sought to replace the bag filter with another filter in an effort to improve results.

A typical bag filter with a diameter of seven(7) inches, and a length of twenty-six(26) inches would give 5 square feet of filtration area. Replacing the bag filter 21 with a pleated filter element of the same diameter and length, such as the MAXUM® element sold by Applicant's assignee, was shown to give approximately fifty(50) square feet of surface area, or almost a tenfold increase in filter area. The MAXUM® element covered by U.S. Pat. No. 5,250,179 was a coreless filter specifically designed to replace the bag filter, and is sometimes called a "pleated bag filter" in the industry. Like the bag filter, there was no core so the element cost and the disposal cost were cut with regard to traditional pleated filter elements, making them competitive with the bag filters, and at the same time greatly increasing the surface area available for filtration. However, these large, cylindrical, elements were extremely difficult to remove, for the reasons previously cited.

Figure 2A:
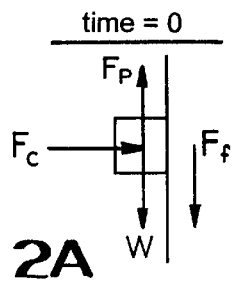
FIG. 2A is a force diagram showing the forces needed to begin the movement of one of the conical filter elements of FIG. 2 when the element had accumulated a substantial filter cake, and it was time for replacement of the element.
Figure 2B:
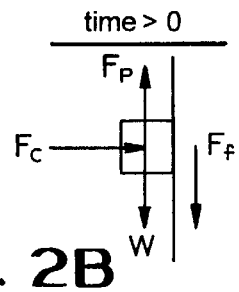
FIG. 2B is a force diagram showing the forces needed to remove the element at some time after the initial movement of the element, at T=0.5 seconds, for example.

In an attempt to ease the removal difficulty, an assembly incorporating several smaller diameter elements was designed to replace a single element configuration. Thus, three 2.75 inch diameter, 26 inch long, elements were configured into a filter assembly. Such a filter assembly, sold by Applicant's assignees under the trademark TRI-MAX™, is shown in FIG. 2. The TRI-MAX™ assembly, generally designated by the numeral 29, includes a tube sheet 30 having a plurality of openings 30A therein. Extending downwardly from the openings are a plurality of perforated cylindrical members 31 into which a plurality of filter elements 32, such as those described in the aforementioned U.S. Pat. No. 5,250,179, are inserted. The use of a TRI-MAX™ assembly, having three elements therein, gave a substantial increase in surface filtration area over a conventional bag. Since each Tri-Max™ element contains approximately fourteen(14) square feet of surface area, the use of a TriMax™ assembly, having three elements therein, holds a significant advantage over the conventional bag filter. However, three TriMaX™ elements still utilized less surface area than one large Maxum™ element, 42 square feet versus 50 square feet. In spite of the smaller element design, however, the TriMax™ elements remained difficult to remove due to the cylindrical design of the element.

Figure 2C:
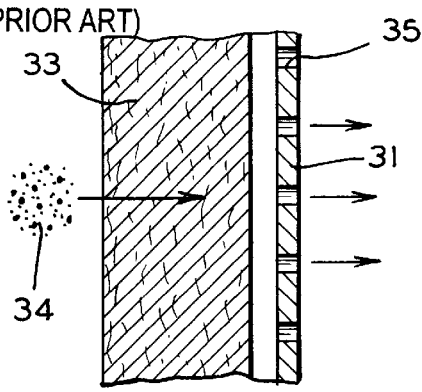
FIG. 2C is a sectional view, taken in the direction of the arrows, along the section line 2C—2C of FIG. 2, and shows the operation of one of the conical elements of FIG. 2 before the element becomes clogged or accumulates a substantial filter cake of the particles shown.

Referring to FIG. 2C there is shown a cross section through a pleat 33 of one of the elements 32. The particles 34 contained in the fluid being filtered deposit themselves on the pleat 33 while the fluid, as shown by the arrows, flows through the pleat 33 and out the perforations 35 in the cylindrical member 31.

FIG. 2C shows the filter element 32 early in its useful life before the filter cake has built up and caused the differential pressure to increase.

Figure 2D:
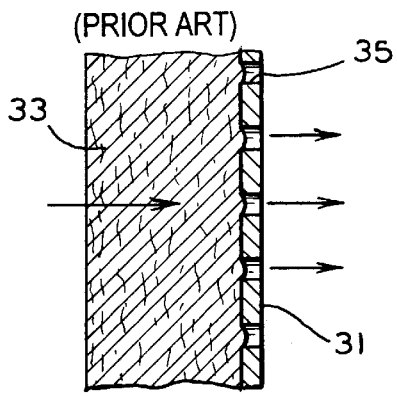
FIG. 2D is a view similar to FIG. 2C, but showing the media being forced into the openings of the filter cage or support after the accumulation of a heavy filter cake on the media.
Figure 2:
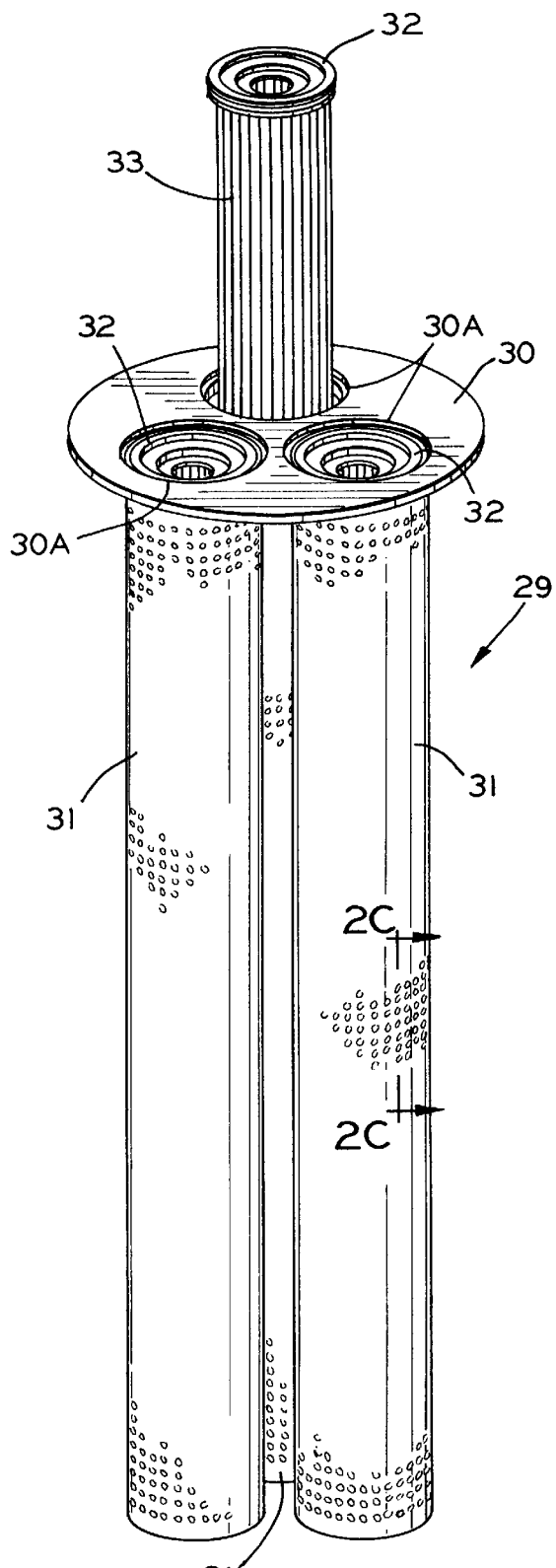
FIG. 2 is a perspective view of a known prior art substitute for the bag filter of FIG. 1.

FIG. 2D shows the same filter pleat 33 after a filter cake has been deposited on the inside of the filter element 32. The pleat 33 has now been extruded into the perforations 35 of the cylindrical member 31.

FIGS. 2A and 2B, to be described more fully hereinafter, show force diagrams detailing the forces necessary to remove the filter elements 32 under the conditions shown in FIG. 2D, both at a time equal zero just when the removal has started, and the continuing force necessary at a time greater than zero at t=0.5 seconds, for example.

For each of the cylindrical elements 32, the force required to move the element, ignoring, for the purposes of illustration, any forces added due to the possible presence of an O-ring, will be indicated by $F_p$, therefore:

$$F_p = W + F_f \quad (1)$$

$$F_f = \mu F_c \quad (2)$$

Therefore:

$$F_p = W + \mu F_c, \quad (3)$$

where $F_p$: force required to move element $F_f$: friction force between the element and the cage $F_c$: force on side of the element caused by packing contaminants W: weight of the element $\mu$: coefficient of friction It is assumed with the free body diagrams and equations that the contaminant force $F_c$ is much greater than the weight of the element. This high contaminant force, combined with the high coefficient of friction between the perforated metal and the wet media causes an extremely high friction force along the entire length of the element making removal extremely difficult.

The derivation for the cylindrical filter elements at a time T greater than 0, again ignoring any forces which may be present due to an O-ring results in essentially the same formula as can be seen below.

$$F_p = W + F_f \quad (1)$$

$$F_f = \mu F_c \quad (2)$$

$$F_p = W + \mu F_c \quad (3)$$

Therefore, it can be seen that the force required to remove the prior art conical filter element starts our high, and remains high for the entire length of the element. The following example is an illustration of this.

EXAMPLE 1

With reference to FIGS. 2A & 2B, it is assumed that at an initial time (t=0) the combined element weigh and contamination loading are 10 lbs. It is generally recommended that this type of filter element be changed when the differential pressure approaches 25–30 lbs., and that differential pressure not exceed 40 psid. Based on this recommended criteria, and combining the normal component of the weight value, it is felt proper to estimate the normal component of the weight value at 40 pounds ($F_c$=40 lbs). Although the element is not under pressure during change out, wet media will be extruded into holes in the cage and make removal more difficult.

Along with this, the coefficient of friction between the wet media and the porous cage can be estimated at 0.5 ($\mu$=0.5). It should be understood that this is a very rough approximation. In practice, it has been found that the coefficient will vary widely, depending on how "dirty" the fluid being filtered is. In some cases, with a very "dirty" media, removal may be virtually impossible without first going around and "tapping" the porous cage to break up the filter cake which has formed on the inside of the element. Thus:

$$F_p = W + F_f$$

$$F_f = \mu \times F_c$$

$$F_p = W + (\mu \times F_c)$$

Thus, $F_p = 10 + (40.0 \times 0.50) = 10 + 20 = 30$ lbs. Therefore, removing the prior art filter element of the example involves an operation not unlike lifting an equivalent weight into the air for a height equal to the length of the filter element, which can be from 3 to 6 feet or more. This is a very tiring and difficult operation.

Because of this difficulty in removing the filter elements 32 from the cylindrical members 31, efforts continued to find a more satisfactory replacement to the bag filter assembly 20 of FIG. 1.

Figure 3:
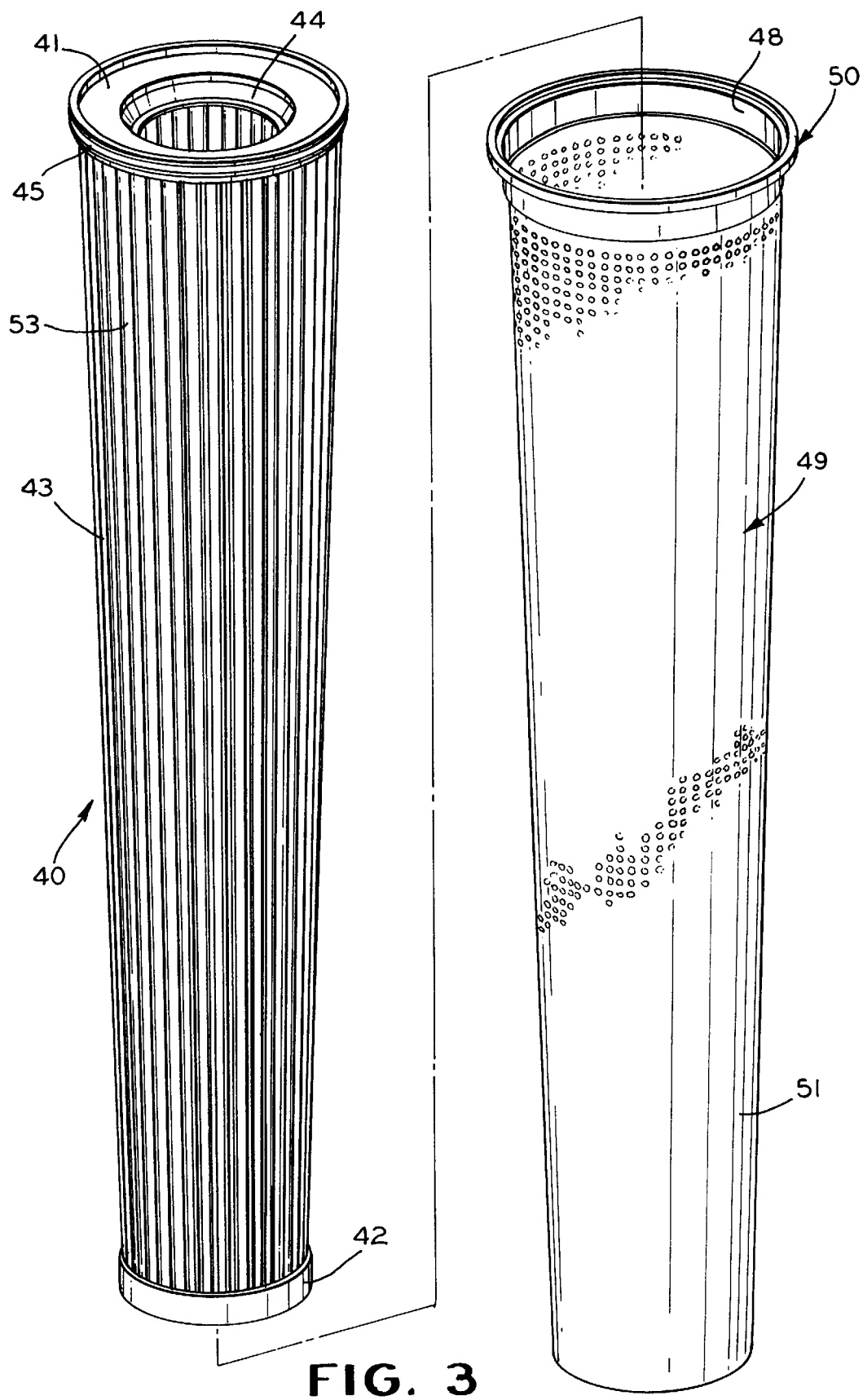
FIG. 3 is a perspective view of a construction embodying the present invention.
Figure 5:
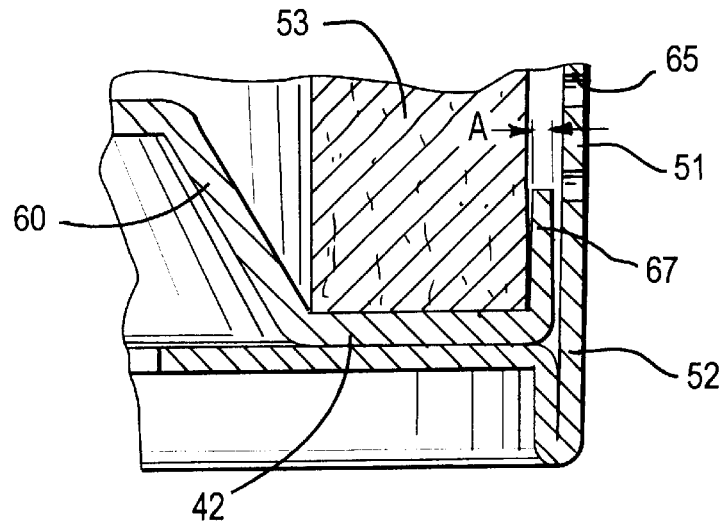
FIG. 5 is a sectional view, on an enlarged scale, of the view encircled by the view circle 5 of FIG. 4.
Figure 6:
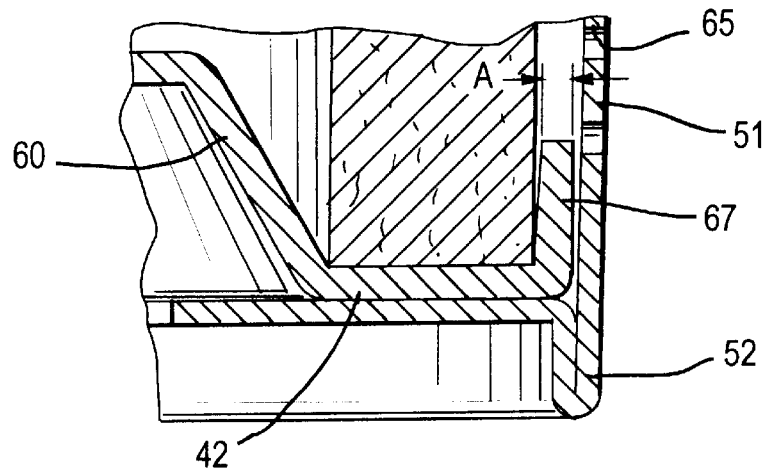
FIG. 6 is a view similar in part to FIG. 5 showing the effect of a thicker end cap.
Figure 7:
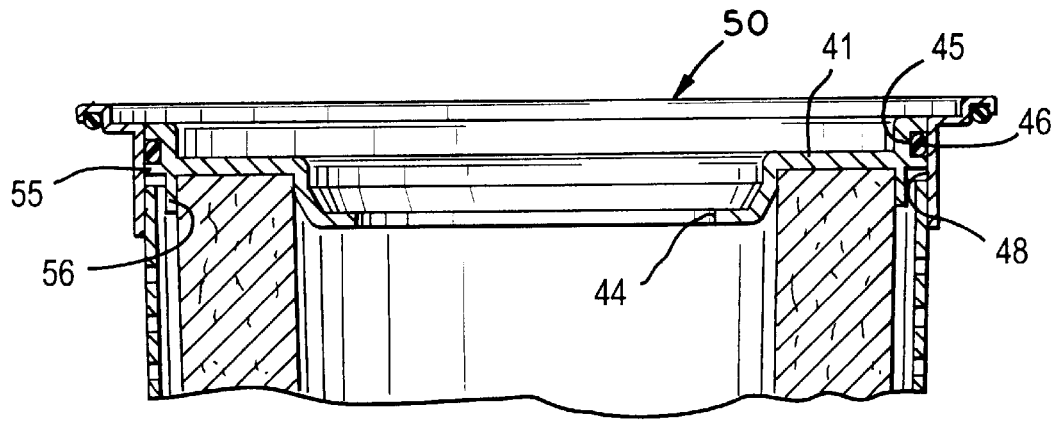
FIG. 7 is an enlarged, fragmentary, view showing the upper end cap and housing adapter shown in FIG. 4.

After further efforts, the construction shown in FIG. 3 was arrived at. In describing the construction of FIG. 3, and throughout the remainder of the specification and claims, the term "conical" should be understood to include a conical or frustraconical construction. A crushable, pleated, conical filter cartridge or element, generally designated by the numeral 40, is provided. The conical coreless pleated element 40 comprises a filter media 43 in an annular configuration, which may be pleated. The element 40 has rigid end caps 41 and 42 sealingly bonded to the ends of the conical filter element 40.

Bottom or lower end cap 42 may be closed to prevent fluid flow therethrough. The upper or top end cap 41 is annular in nature and has a fluid inlet 44 to permit the entry of the media to be filtered.

Referring to FIGS. 3 and 4, it can be seen that an outwardly facing peripheral groove 45 is provided about the periphery of the upper end cap 41. An O-ring 46 of suitable composition and size is placed in the outwardly facing peripheral groove 45 to seal the upper end cap 44, and thus the filter cartridge 40, to the inner radial face 48 of the conical member 49.

The conical member, generally designated by the numeral 49, includes the housing adapter 50, a cage portion 51, as well as a lower end cap 52. The diameter of the conical member 49 is the same as or slightly greater than the diameter of the conical filter cartridge 40 which it contains.

The conical member 49 and filter cartridge 40 are shown in more detail in FIGS. 4–7. The top or upper end cap 41 includes, in addition to the inlet 44 and the outwardly facing peripheral groove 45, a lower annular flange 55, and a radial flange 56, which cooperate to hold the cartridge 40 in the conical member 49.

The lower end cap 42 may include a concave portion 60 that extends only partially inward of the conical pleated annular filter element 40.

The filter elements 40 of the present invention are intended to filter any particles from any of a wide of variety of liquids such as water, oils, fuels, glycols, chemical wastes and amines.

The filter media 43 is preferably, but not necessarily, made of compactable and incinerable material. The media may be made of any woven or non-woven fiber such as cellulose, polypropylene, polyester, nylon, borosilicate, polytetraflourethylene, E-CTFE, polypropylene, polyethylene, stainless steel and others.

The formed or molded end caps (41,42) may be made from a wide variety of moldable thermoplastic materials in order to provide chemical compatability with the various fluids to be filtered. For example, the thermoplastic materials may be polypropylene, polyethylene, polyester, nylon, polytetraflourethylene, polyvinylidene fluoride, polyetherimide, as well as others. Although in the preferred embodiment, the end caps are also incinerable and compactable, the use of materials which are not incinerable and compactable, such as metals and ceramics, is well within the scope of the present invention. The use of formable materials such as epoxies, plastisols and urethanes is also contemplated, and is also well within the scope of the present invention.

The use of positive sealing mechanisms, such as O-rings 46, may provide more choices in selecting sealing materials than filters in which the end caps are made from a moldable elastomeric material and the filter media is potted into the end caps. The range of resilient, potable elastomers is limited to include compounds such as epoxies, urethanes and plastisols, and cannot offer the wide range of chemical compatibility afforded by all of the different types of materials available in O-rings or gaskets such as nitrile, silicone, ethylene propylene diene, polytetrafluoro-ethylene, neoprene, isoprene, fluorosilicone or perfluoroelastomers, as well as others.

The cage 51 comprises a perforated metal or plastic sheet formed into a cone, a cast or stamped perforated metal assembly, or a thermoplastic injection molded assembly. A lower end cap 52 may be fastened to the narrow end of the cone, and may be open to aid in the removal of the filter cartridge 40 by applying pressure to the bottom or lower end cap 42, preferably in the area of the concave portion 60 formed therein.

However, as will be discussed hereinafter in connection with FIGS. 13–16, the lower end cap 52 may be omitted leaving an open end on the cage 51 or the lower end cap 52 maybe provided with a relief valve 114 which fits through an opening 110 in the lower end cap 42 of the conical element 40.

If multiple filter elements are going to be used in a filter housing, the housing adaptor 50 may be placed into suitable openings in a tube sheet (not shown) to provide for a multiple element filter assembly. If only a single element filter assembly is needed, the housing adapter 50 may simply fit in a suitable filter housing.

The diameter should be chosen properly to provide sealing between the end cap 41 and the inner radial face 48. The housing adapter 50 has a flange portion 61 in which about the periphery thereof is formed a downwardly facing peripheral groove 62 into which is inserted second O-ring 63. Second O-ring 63 provides for the sealing of the housing adapter 50 into a housing or tube sheet (not shown).

An analysis of the conical construction shows the advantage over the prior art construction of FIG. 2. FIG. 4C is similar to that of FIG. 2C, but drawn to reflect the conical construction. The fluid flow, shown by the arrows, shows that the particles 34 flow through a conical pleat 53 of the filter media 43. The particles 34 are deposited on the filter media 43 as the fluid being filtered travels through the perforations 65 in the filter cage 51. As more and more particles 34 are deposited on pleats 53, the differential pressure increases, and the pleats 53 come into contact with, and in some cases are extruded into, the perforations 65. The force diagrams of FIG. 4A and 4B show the forces present when attempting to remove the filter cartridge 40 from the cylindrical member 49. The force required to move the element is:

$$F_p = W + F_f \quad (1)$$

In this case $$F_f = \mu \times \cos(\phi) \times (F_c + (W \times \sin(\phi))) \quad (2)$$

Therefore, the force on the side of the cartridge equals:

$$F_p = W + \mu \times \cos(\phi) \times (F_c = (W \times \sin(\phi))) \quad (3)$$

for time T=0.

However for the conical configuration at a time greater than zero, i.e., after the removal process has been started, $F_p$ simply equals W, the weight of the element. This is in complete contrast to the situation with the tubular element. As shown by the following example, the same diameter element of FIG. 3 versus the cylindrical element of FIG. 2 initially requires less force for removal.

EXAMPLE 2

The same assumptions and values, except for the coefficient of friction, will be used for Example 2 that were used for example 1. However, the coefficient of friction will be lower ($\mu$=0.4) because the direction of pull for removal is not entirely perpendicular to the cage.

Again, the example can be broken into two parts. At time, t=0, the force needed for removal, with a cone angle $\phi$=2° is:

$$F_p = 10 + 0.40 \times \cos(2) \times (40 + (10 \times \sin(2)))$$

$$F_p = 26.13 \text{ lbs.}$$

This is a significant reduction in the force required. The force can be reduced even more by the use of a larger angle on the porous element and cage.

To continue with the example, at a time greater than 0, once the initial movement occurs, there will no longer be intimate contact between the element and the cage. Thus, at time t greater than zero, the force needed to finish extracting the element from the cage is equal to the weight of the element, assumed in the example to be:

$$F_p = 10 \text{ lbs.}$$

Therefore, not only is there a significant reduction in the initial force required to begin the removal of the element, but a reduction of two-thirds ((30–10)/30) in the force needed to continue the removal. Thus, a tiring and difficult job of filter maintenance is made significantly easier.

Because of the tendency of the pleats 53 to extrude into the perforations 65 of the cage 51 it is desirable that the rim portion 67 of the bottom or lower end cap 42 be kept as thin as possible such that the dimension A is minimized, and the cage 51 can be, as closely as possible, the same diameter as the filter element 40. In some applications it is contemplated that the rim portion 67 will not be needed and the diameter of the conical member 49 can be the same diameter as the filter element 40. In any case, it is preferable that the diameter of the conical member 49 be only slightly larger than the filter element 40, and that the difference in the diameters be kept as small as possible to prevent rupturing of the filter element 40 when the filter media 43, and thus the pleats 53, expand in operation.

Figure 8:
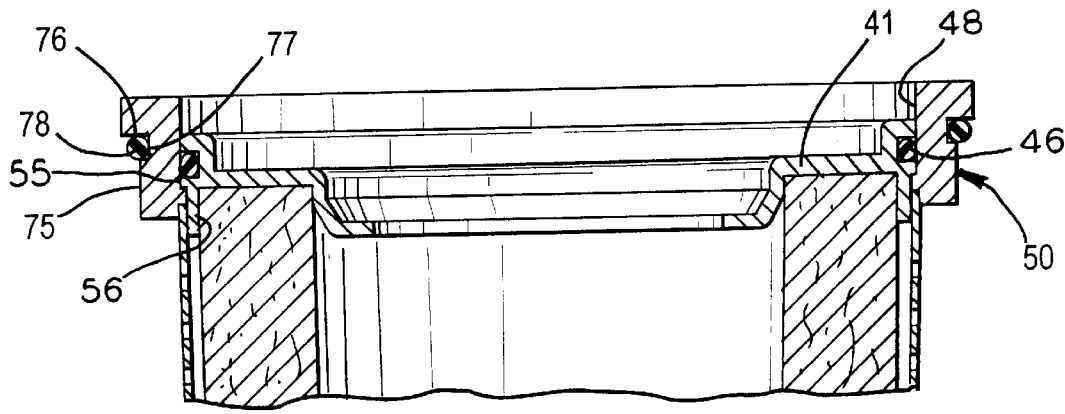
FIG. 8 is a modification of the construction shown in FIG. 7.
Figure 9:
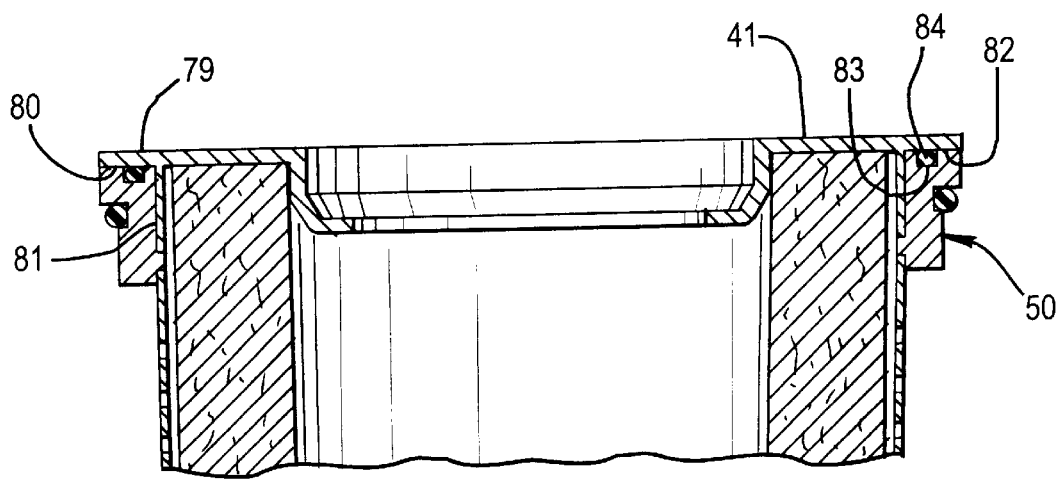
FIG. 9 is another modification of the construction shown in FIG. 7.
Figure 10:
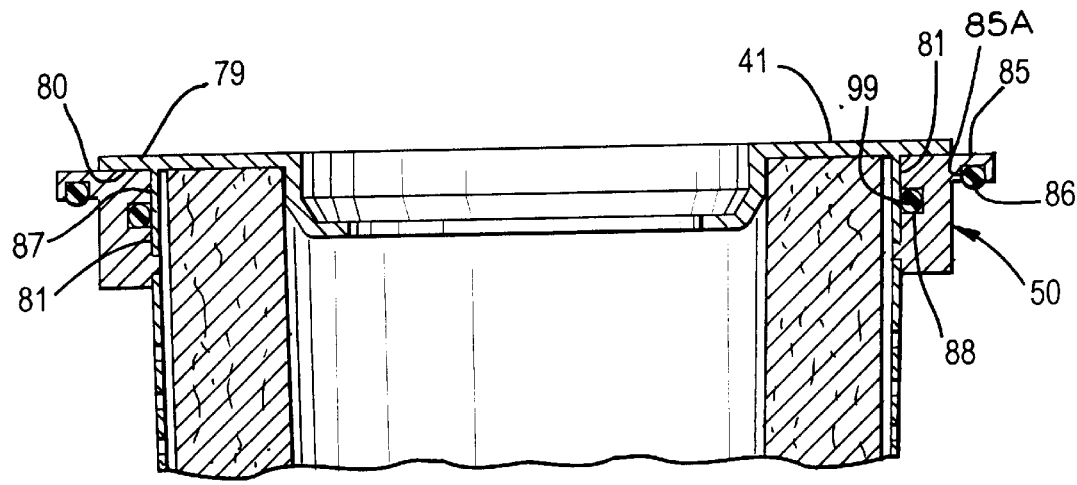
FIG. 10 is yet another modification of the construction shown in FIG. 7.

Referring to FIGS. 8–10 it can be seen that the top or upper end cap 41 and the housing adapter 50 may take many forms, depending upon the application required. The forms illustrated are only a few of the many possible forms that may be used, and any practicable form of the end cap and housing adapter are well within the scope of the claims of the present invention.

As shown in FIG. 8, housing adapter 50 may have an outer radial sealing face 75 and a flange portion 76 between which is formed an outwardly facing peripheral groove 77 in which is placed an O-ring 78. An inner radial sealing face 48 is provided to accept end cap 41 in the manner shown in FIG. 7.

As shown in FIG. 9, the top or upper end cap 41 may have a flat face 79 together with a lower annular sealing face 80 and a radial face 81. The housing adapter 50 may have a flat upper face 82 in which is formed an upwardly facing peripheral groove 83 which accepts an O-ring 84. It can be seen that the lower annular sealing face 80 will seal against the O-ring 84.

In FIG. 10 the top or upper end cap 41 again has an upper flat face 79, a lower annular sealing face 80 and an inner radial face 81. However, in this case, the housing adapter 50 has an annular flanged lip 85 accepting an O-ring 86, in downwardly facing peripheral groove 85A, to seal the housing adapter 50 to a tube sheet or filter housing. Housing adapter 50 also has an inner radial sealing face 87 having an inwardly facing peripheral groove 88 which contains an O-ring 99. The O-ring 99 will seal against the radial sealing face 81 of the top end cap 41.

Figure 11:
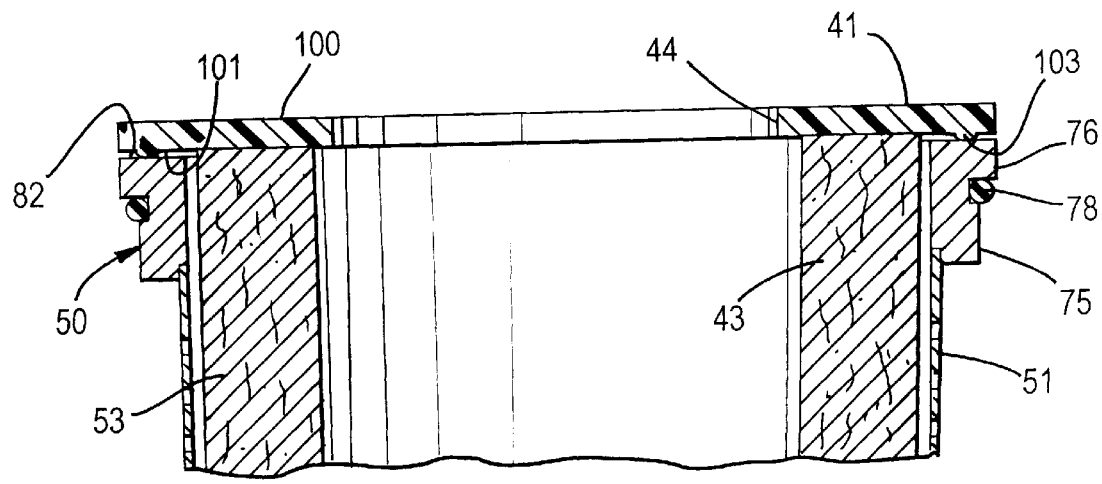
FIG. 11 is a modification of the construction shown in FIG. 8, wherein the top or upper end cap is molded of an epoxy or plastisol or urethane, and has an integral, downwardly extending, sealing surface or gasket molded therein.

Referring to FIG. 11, there is shown a construction similar to that shown in FIG. 8, in that the housing adaptor 50 may be of a construction identical to that shown in FIG. 8, but the upper end cap 41 is substantially different. In this modification of the invention, the top or upper end cap is of a formed or molded epoxy, plastisol or urethane construction. The end cap 41 is molded on to the ends of the pleats 53 formed of the media 43, and has a flat upper surface 100, a flat lower surface 101, and has an annular, downwardly extending sealing means, such as downstanding ridge 103, integrally formed or molded therein. Because the epoxy, plastisol or urethane is soft enough, the ridge 103 will sealingly engage the flat upper face 82 of the housing adaptor 50.

Figure 12:
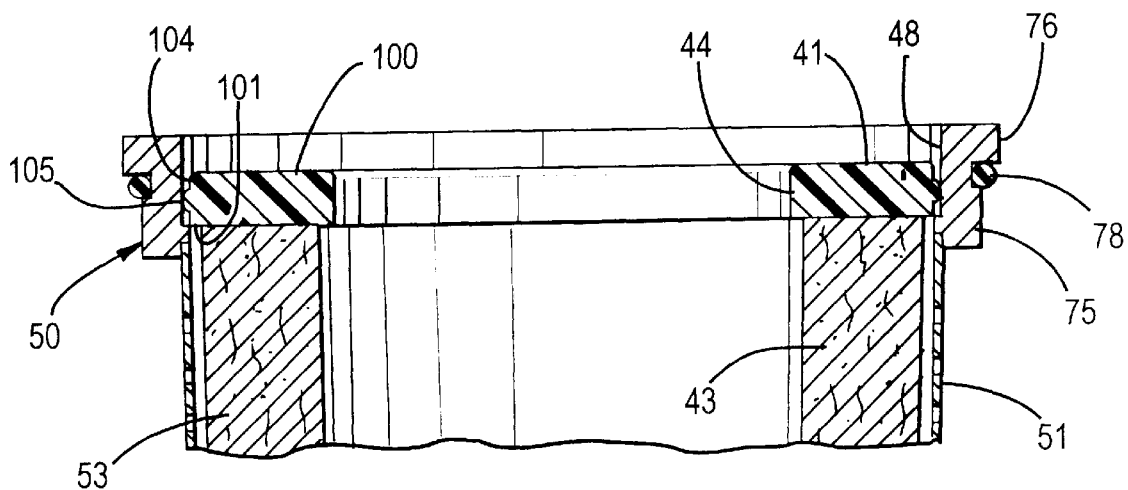
FIG. 12 is a modification of the construction shown in FIG. 11, wherein the integral or molded sealing surface or gasket is facing radially outward.

FIG. 12 again shows an upper end cap molded of epoxy, plastisol, or urethane, but in a piston sealing configuration, instead of the top sealing configuration shown in FIG. 11. Again, the housing adaptor 50 may be of identical configuration to that shown in FIG. 8. The top end cap 41 is again molded to the ends of the pleats 53 formed in the media 43, and has an inlet 44. Upper flat surface 100 is provided. Only a very small portion of lower flat surface 101 is still exposed, and no longer performs a sealing function. Instead, an outer radial end cap face 104 is in sealing engagement with inner radial sealing face 48 of housing adaptor 50 through outer radial sealing means, such as outwardly facing, integrally formed, sealing means or gasket 105.

Figure 13:
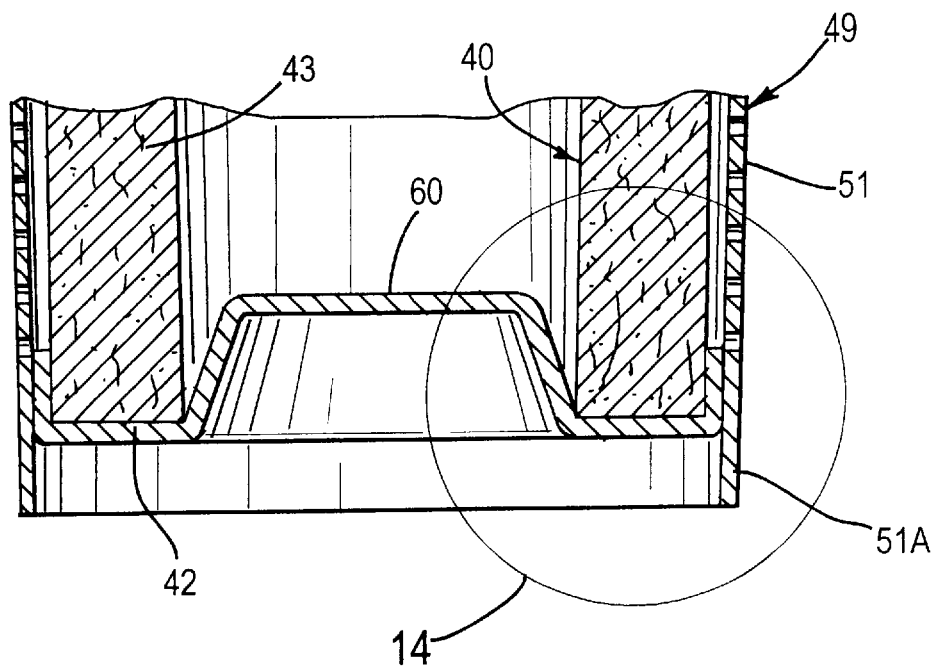
FIG. 13 is a modification of the construction shown in FIG. 4, wherein the conical member has no lower end cap.
Figure 14:
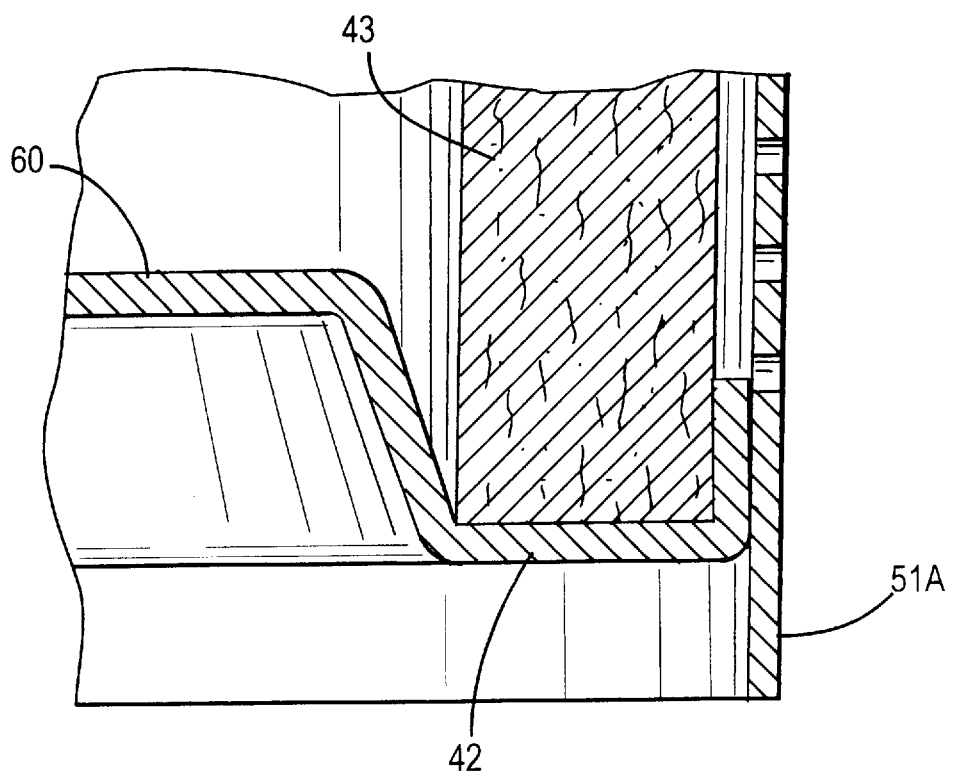
FIG. 14 is a sectional view, on an enlarged scale, of the view encircled by the view circle 14 of FIG. 13.

Referring now to FIG. 13, the filter element 40 is again contained within the conical member 49. The cage 51 is of a diameter slightly larger than the filter element 40 and the end of the filter element 40 is closed by an end cap 42 having a concave portion 60 which extends only partially inward of the conical pleated annular filter element 40. In this modification of the invention, the end cap 52 which was previously formed integral with, or attached to, the cage 51 is omitted. Instead, the cage is extended by a small amount to provide for extension 51A which extends just past the end cap 42. Since the end cap 42 is affixed to the media 43, and the flow through the filter element 40 is from in to out, there need be no sealing function between the end cap 42 and the cage 51 and the end cap 42 may simply abut the cage 51. This shown in more detail in FIG. 14.

Figure 15:
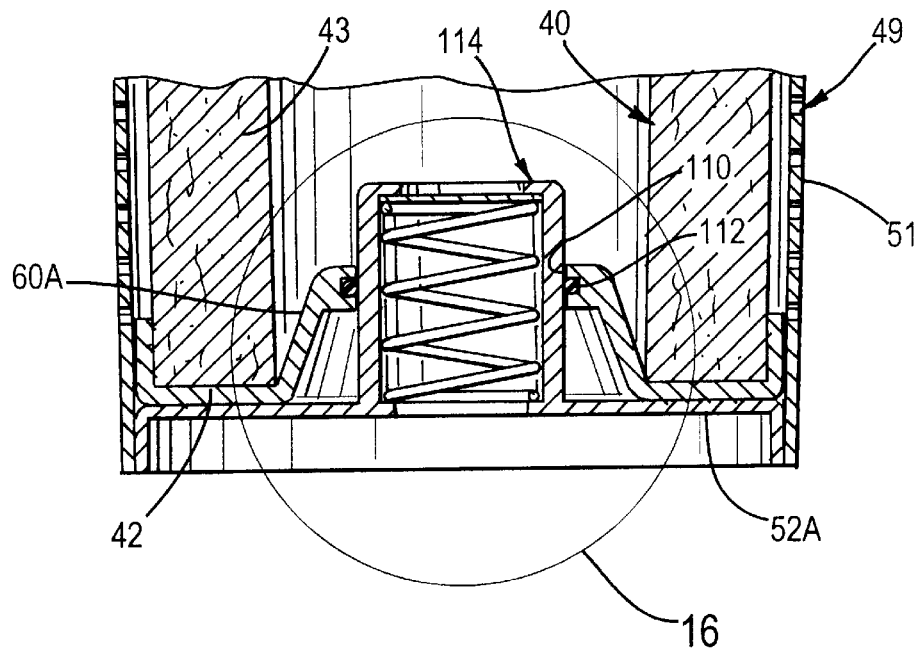
FIG. 15 is a further modification of the construction shown in FIG. 4, wherein the frustraconical pleated filter element has an open lower end cap which sealingly engages a relief valve provided on the lower end cap of the conical member.
Figure 16:
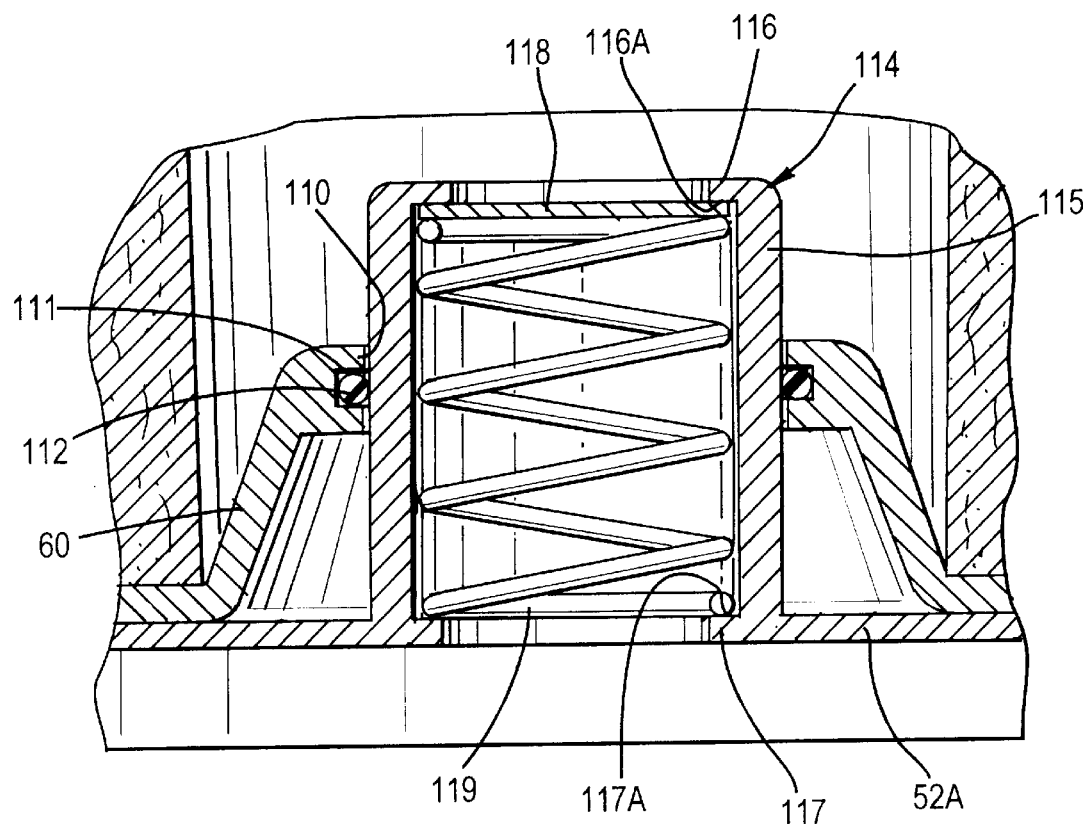
FIG. 16 is a sectional view, on an enlarged scale of the view encircled by the view circle 16 of FIG. 15.

Referring now to FIGS. 15 and 16, the filter element 40 is again contained within the conical member 49. The diameter of the cage 51 is, as before, the same as or slightly larger than the diameter of the filter element 40 which it contains. In this modification of the invention, the lower end cap 42 of the filter element 40 has a modified concave portion 60A having an opening 110 therein. Provided in the opening is an inwardly facing concave groove 111 having an O-ring 112 contained therein.

A pressure relief valve, generally designated by the numeral 114, is provided on the modified lower end cap 52A of the conical member 49. The relief valve 114 may include a include a hollow upstanding cylinder 115 surrounding opening 113 provided centrally of the modified end cap 52A. An upper parametrical lip 116 and a lower parametrical lip 117 are provided at either end of the cylinder 115 to provide an upper retaining surface 116A and a lower retaining surface 117A respectively. A circular retaining plate 118 is retained against the upper retaining surface 116A by the force of a retaining spring 119 bearing against lower retaining lip 117A. The spring constant of the spring 119A is chosen depending upon the application such that the retaining plate 118 may move downwardly and thus provide for flow through the conical member 49 should the filter element 40 become clogged or the differential pressure become too high. It can easily be understood that although the shape of the relief valve 114 is circular in the preferred embodiment, the shape of the opening 110 and the shape of the hollow cylinder 115 may be other than circular and still well within the scope of the present invention.

It can also be seen that a relief valve 115 can be provided at other locations within the conical member 49, such as proximate the upper end thereof, and still be well within the scope of the present invention.

The conical filter construction provides approximately the same surface area (50 square feet versus 50 square feet) as the conventional cylindrical element. However, it provides a significant advantage over the TriMax™ configuration (50 square feet versus 42 square feet). This translates into more surface area, longer life, and a great reduction in changeout difficulties.

Thus by carefully analyzing the problems present with prior art bag filters, and attempted substitutes therefore, we have developed a novel conical coreless filter assembly.

What is claimed is:

1. A conical, coreless, filter cartridge, said filter cartridge including:
    a) a conically shaped media,
    b) a closed lower end cap affixed to one end of said conically shaped media to prevent flow through said conical, coreless, filter cartridge, and
    c) an open, annular, upper end cap sealingly bonded to the other end of said conically shaped media to permit flow to the interior of said conical, coreless filter cartridge.

2. A filter assembly including:
    a) the conical, coreless, filter cartridge defined in claim 1, and;
    b) a conical member having an inside diameter the same as, or slightly larger, than the outside diameter of said conical, coreless, filter cartridge it contains; and
    c) a housing adapter affixed to one end of said conical member and sealingly engaging said open annular end cap of said conical coreless filter cartridge.

3. The filter assembly defined in claim 2, wherein said conical member is porous.

4. The filter assembly defined in claim 3, wherein said conical member includes;
    a) a housing adapter,
    b) a conical porous filter cage fixedly attached to said housing adapter, and said conical porous filter cage being slightly longer than the filter cartridge it contains.

5. The filter assembly defined in claim 3, wherein said conical member includes;

a) a housing adapter, b) a conical porous filter cage attached to said housing adapter, and c) a relief valve.

6. The filter assembly defined in claim 5, wherein said conical member further includes;

a) a modified lower end cap attached to the bottom of said filter cage, and b) said relief valve provided on said modified lower end cap.

7. The filter assembly defined in claim 6, wherein said modified lower end cap includes;

a) an opening of a predetermined size and shape.

8. The filter assembly defined in claim 7, wherein said relief valve includes;

a) an upstanding hollow cylinder of a diameter slightly larger than said opening, b) an upper lip proximate the upper end of said upstanding cylinder, c) a lower lip proximate the bottom end of said upstanding cylinder, d) a spring constrained inside said upstanding cylinder, and e) a retainer plate interposed between the upper end of said spring and said upper lip;

said lower end cap of said filter cartridge having an opening therein of a complimentary size and shape to the size and shape of said upstanding hollow cylinder, said opening in said lower end cap having an inwardly facing radial groove with an O-ring contained therein, said opening in said lower end cap sealingly engaging said relief valve when said filter cartridge is inserted in said conical filter cage.

9. The filter assembly defined in claim 3, wherein said conical member further includes:

a) a conical, porous filter cage fixedly attached to said housing adapter, and b) a lower end cap fixedly attached to the bottom of said conical filter cage.

10. The filter assembly defined in claim 9, wherein said lower end cap of said filter cartridge is solid.

11. The assembly defined in claim 10, wherein said lower end cap of said filter cartridge includes a concave portion.

12. The assembly defined in claim 9, wherein said lower end cap of said conical member is open to aid in the removal of said filter cartridge.

13. The filter assembly defined in claim 9, wherein said housing adapter has an inner radial face.

14. The filter assembly defined in claim 13, wherein said upper open end cap is bonded to said filter cartridge and has an outwardly facing radial groove.

15. The filter assembly defined in claim 14, and further including an O-ring contained in said outwardly facing radial groove.

16. The assembly defined in claim 15, wherein said O-ring sealingly contacts said inner radial face of said housing adapter to seal said filter cartridge in said conical member.

17. The filter assembly defined in claim 16, wherein said housing adapter further includes:

a) a flange portion, b) a downwardly facing peripheral groove formed on said flange portion, and c) a second O-ring contained in said downwardly facing peripheral groove.

18. The filter assembly defined in claim 13, wherein said housing adapter includes:

a) an outer radial sealing face, b) a flange portion, and c) an outwardly facing peripheral groove formed between said outer radial sealing face and said flange portion, said outwardly facing peripheral groove containing, d) an O-ring.

19. The filter assembly defined in claim 9, wherein said upper end cap includes:

a) a flat upper face, b) a lower annular sealing face, and c) a radial face.

20. The filter assembly defined in claim 19, wherein said housing adapter includes:

a) a flat upper face, b) an upwardly facing peripheral groove, and c) an O-ring contained in said upwardly facing peripheral groove, said lower annular sealing face of said upper end cap sealingly contacting said O-ring.

21. The filter assembly defined in claim 9, wherein said top end cap includes:

a) an upper flat face, b) a lower annular sealing face, and c) a radial face.

22. The filter assembly defined in claim 21, wherein said housing adapter includes:

a) an annular flanged lip, b) a downwardly facing peripheral groove in said annular flanged lip, c) an O-ring carried in said downwardly facing peripheral groove, d) an inner radial sealing face, e) an inwardly facing peripheral groove formed in said inner radial sealing groove, and f) an O-ring carried by said inwardly facing peripheral groove.

23. The filter assembly defined in claim 9, wherein said upper end cap of said filter cartridge is made of metal.

24. The filter assembly defined in claim 9, wherein said upper end cap of said filter cartridge is made of ceramic.

25. The filter assembly defined in claim 9, wherein said upper end cap of said filter cartridge is made of plastisol, and includes;

a) a flat upper surface, b) a flat lower surface, said flat lower surface having a downstanding sealing ridge integrally formed therein.

26. The filter assembly defined in claim 9, wherein said upper end cap of said filter cartridge is made of urethane, and includes;

a) a flat upper surface, b) a flat lower surface, said flat lower surface having a downstanding sealing ridge integrally formed therein.

27. The filter assembly defined in claim 9, wherein said upper end cap of said filter cartridge is made of epoxy, and includes;

a) a flat upper surface, b) a flat lower surface, said flat lower surface having a downstanding sealing ridge integrally formed therein.

28. The filter assembly defined in claim 9, wherein said upper end cap of said filter cartridge is made of a moldable thermoplastic material.

29. The filter assembly defined in claim 9, wherein said upper end cap of said filter cartridge is made of a thermoformable plastic material.

30. The filter assembly defined in claim 9, wherein said upper end cap of said filter cartridge is made of plastisol, and includes;
   a) a flat upper surface,
   b) a flat lower surface, and
   c) an outer, radial, end cap face, said outer, radial, end cap face having outer radial sealing means integrally formed thereon.

31. The filter assembly defined in claim 9, wherein said upper end cap of said filter cartridge is made of urethane, and includes;
   a) a flat upper surface,
   b) a flat lower surface, and
   c) an outer, radial, end cap face, said outer, radial, end cap face having outer radial sealing means integrally formed thereon.

32. The filter assembly defined in claim 9, wherein said upper end cap of said filter cartridge is made of epoxy, and includes;
   a) a flat upper surface,
   b) a flat lower surface, and
   c) an outer, radial, end cap face, said outer, radial, end cap face having outer radial sealing means integrally formed thereon.

* * * * *